Dec. 8, 1925.
P. R. PROSSER
GEAR SHIFT MECHANISM
Filed May 20, 1925
1,564,622
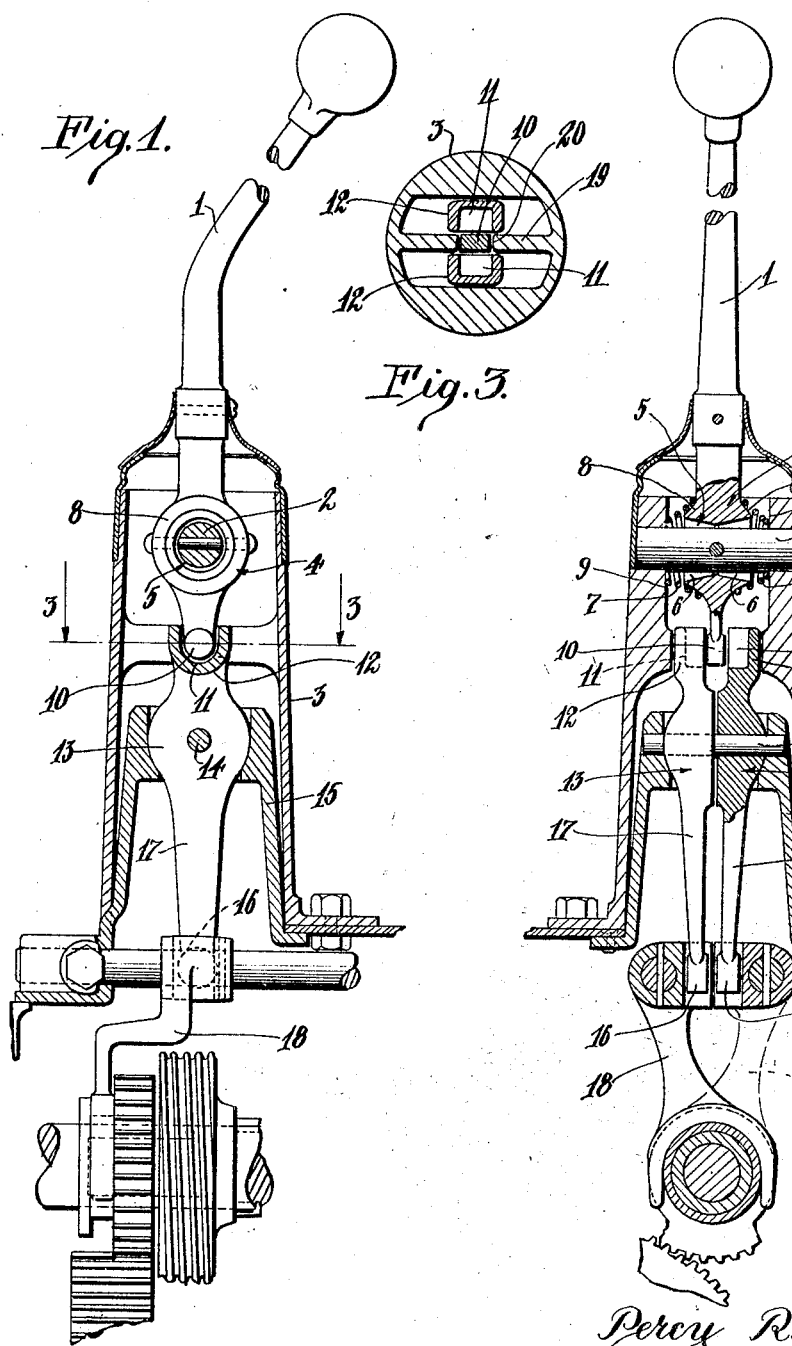
Inventor
Percy R. Prosser.
By Lyon & Lyon
Attorneys Patented Dec. 8, 1925.

1,564,622

UNITED STATES PATENT OFFICE.

PERCY R. PROSSER, OF PASADENA, CALIFORNIA.

GEAR-SHIFT MECHANISM.

Application filed May 20, 1925. Serial No. 31,613.

*To all whom it may concern:*

Be it known that I, PERCY R. PROSSER, a citizen of the United States, residing at Pasadena, in the county of Los Angeles, State of California, have invented a new and useful Gear-Shift Mechanism, of which the following is a specification.

This invention relates to gear shifts and is more particularly directed to a gear shift mechanism adapted to be substituted for the gear shift mechanism provided by the manufacturer of a well-known type of motor vehicle to convert the gear shift to the recognized standard shift.

A motor vehicle of large manufacture and popular make has a gear shift mechanism which is practically the reverse of the standard shift in that the shift lever is operated through the following positions to engage the following gears. The gear shift lever is situated intermediate the front seat of the motor vehicle and is shifted to the left and forward to engage the low gear and to the right and back for second gear and forward to the right for engaging high gear. The left and back is reverse, which is exactly opposite the standard shift. Many serious accidents have been caused because of the reverse shift both to life and property, due to the fact that operators who are in the habit of handling a motor vehicle having a standard shift err in shifting the gears of such motor vehicle above referred to. Gears are often jammed and ruined because of this reverse shift, and the operator often shifts the gear into reverse when he intends to shift the same into low, or into second when he intends to shift the same into high.

Many operators object to this reverse gear shift and do not purchase this make of motor vehicle because of this feature. Particularly is this true of operators or owners of more than one motor vehicle. It is therefore an object of this invention to provide a simple and easily installed mechanism for converting these reverse gear shifts to the customary standard shift.

It is a further object of this invention to provide an efficient, inexpensive and easily installed shift mechanism of the standard type.

Other objects and advantages of this invention will be apparent from the following detailed description thereof as illustrated in the accompanying drawings.

In the drawings:

Fig. 1 is a side elevation of a gear shift mechanism embodying this invention, illustrating the casing for the shift mechanism in side elevation.

Fig. 2 is a rear end elevation thereof illustrating the casings in sectional end elevation.

Fig. 3 is a sectional plan view taken substantially on the line 3—3 of Fig. 1.

In the preferred embodiment of this invention illustrated in the accompanying drawings, 1 illustrates the shifting lever which is pivotally mounted at a pin 2 within the casing 3. The lever 1 is provided at its lower end with a section 4 of increased cross section. A bore 5 is formed therethrough and through which the pin 2 is projected, the bore 5 being at its central portion of slightly greater diameter than the diameter of the pin 2 and provided with frusto-conical bores 6 diverging outwardly from the center thereof so that the shift lever 1 may be rocked upon the pin 2 as well as pivoted thereon.

A pair of coil springs 7 encircle the pin 2 and the opposite sides of the shift lever 1 and are fitted over bosses 8 which form the increased section 4 of the lever 1. The inner ends of the springs 7 engage the sides of the lever 1 and the outer ends of the springs 7 engage the sides 9 of the casing 3. The lower end of the lever 1 is provided with a head 10 which is adapted to be shifted into engagement within the recesses 11 formed in the upper ends 12 of the intermediate shift members 13, which intermediate shift members 13 are pivoted at the pin 14 within the casing 15. Heads 16 are provided on the lower extending arms 17 of the intermediate shift members 13 and are at all times in engagement with the shift forks 18 which engage the shifting plungers which are operated to shift the gears in a manner well understood, and which applicant does not vary or change and does not, therefore, deem it necessary to describe.

The casing 3 is provided with an intermediate web 19 (see Fig. 3) which has a center slot 20 formed therethrough. The head 10 of the shift lever 1 normally rests in the slot 20 formed in the intermediate web 19 when the gears are not in use, or this slot 20 provides the intermediate position of the gear shift mechanism.

By shifting the head 10 downward in Fig.

3, the same is engaged within the recess 11 formed in the upper portion 12 of the intermediate shift levers 13, and on sliding the shift lever 1 forward, the member 10 is retained in position within the recess 11 and the intermediate web 19 so that the same can remain in position. The shift lever 1 is maintained in position in a like manner when the head 10 thereof is shifted into the slot 11 formed in the head 12 of the opposite intermediate shift lever 13.

Having fully described the preferred embodiment of my invention, it is to be understood that the same may be varied in detail without departing from the spirit thereof as set forth in the appended claims.

I claim:—

1. In a device of the class described, the combination of a casting having a pair of guide slots formed therein, an intermediate dividing partition between the said slots and having a central passage therethrough, a shift lever adapted to move in each slot and presenting a pocket within the said slot, and a control lever adapted to be engaged in the said pocket of either of said shift levers to actuate the same.

2. In a device of the class described the combination of a pair of gear shift levers pivotally mounted at a pin and having pockets formed in their upper ends, a casting having a pair of guide slots formed therein in which the pockets are adapted to be moved, an intermediate dividing partition between the said slots, having a central passage therethrough, and a control lever adapted to be engaged in either one of said pockets to move the same.

3. In a device of the class described the combination of a pair of gear shift levers pivotally supported at a pin and having pockets formed in their upper ends, a casting having a pair of guide slots in which the pockets are adapted to move and a central dividing partition having a central passage therethrough, a control lever adapted to be engaged at its lower end in either one of said pockets, and means normally urging the lower end of said control lever into the central passage.

4. In a device of the class described the combination of a casing means for pivotally supporting a pair of shift levers at a pin within a casing adapted to be positioned over the first said casing and to pivotally support a control lever, a pocket at the upper end of each of said gear shift levers, a pair of guide slots in which the pockets are adapted to move formed in the second said casing a central partition separating the said guide slots and having a central passage a head formed on the lower end of the control lever and adapted to be engaged within either of said slots and means normally urging the said head toward the central passage.

Signed at Pasadena Calif. this 9th day of May 1925.

PERCY R. PROSSER.